(12) United States Patent
Coupland et al.

(10) Patent No.: US 7,076,451 B1
(45) Date of Patent: Jul. 11, 2006

(54) SYSTEM AND METHOD FOR PROVIDING LODGING RESERVATIONS DATA

(75) Inventors: Richard P. Coupland, Flagstaff, AZ (US); Paul B. McGrath, Scottsdale, AZ (US)

(73) Assignee: Pegasus Solutions, Inc., Dallas, TX (US)

( * ) Notice: Subject to any disclaimer, the term of this patent is extended or adjusted under 35 U.S.C. 154(b) by 546 days.

(21) Appl. No.: 09/862,865

(22) Filed: May 22, 2001

(51) Int. Cl.
*G06Q 30/00* (2006.01)

(52) U.S. Cl. .............................. 705/26; 705/5; 705/6

(58) Field of Classification Search ................ 705/26, 705/27, 1, 5, 6
See application file for complete search history.

(56) References Cited

U.S. PATENT DOCUMENTS

| | | | | |
|---|---|---|---|---|
| 5,832,451 A | * | 11/1998 | Flake et al. ..................... | 705/5 |
| 5,832,454 A | | 11/1998 | Jafri ............................. | 705/6 |
| 5,864,818 A | * | 1/1999 | Feldman ........................ | 705/5 |
| 6,023,679 A | * | 2/2000 | Acebo et al. ................... | 705/5 |
| 2002/0099576 A1 | * | 7/2002 | MacDonald et al. ........... | 705/6 |

OTHER PUBLICATIONS

"Hotel Reservations Network Taps Pegasus Systems to Expand Online Hotel Resevation Capabilities Agreement; Adds 22,00 Hotels to HRM's Consumer Web Site," PR Newswire, New York, Sep. 30, 1998.*
HRN, http://www.180096hotel.com, http://web.archive.org/web/*/www.180096hotel.com, Jan. 25, 1999.*
Ota, Kazuhiko, Pub-No.: JP02002269419A, Sep. 20, 2002.*
Search Report for PCT/US02/16294 Dated Apr. 18, 2003 in parent PCT filing of U.S. application filed herewith.
Hotel Reservation Network [online], Jan. 25, 1999, Retrieved from the internet:<URL: http://web.archive.org/web*/www.180096hotel.com.
Written Opinion for PCT/US02/16294 Dated Jun. 16, 2003 in co-pending PCT filing of U.S. application filed herewith.

* cited by examiner

*Primary Examiner*—Jeffrey A. Smith
*Assistant Examiner*—Matthew S Gart
(74) *Attorney, Agent, or Firm*—Jackson Walker L.L.P.; Christopher J. Rourk

(57) ABSTRACT

A system for providing reservation data is presented. The system includes a reservation data system interface that receives reservation data, such as the availability of rooms and rates for such rooms, and update data, such as when rates change or rooms are reserved, from two or more reservation systems, such as central reservation systems for two or more different hotels. A master reservation system receives the reservation data from the reservation data interface and stores the reservation data in a database, and updates the database with the update data. A user interface system coupled to the master reservation system receives reservation request data and provides updated reservation data in response to the reservation request data.

22 Claims, 4 Drawing Sheets

SYSTEM AND METHOD FOR PROVIDING LODGING RESERVATIONS DATA

FIELD OF THE INVENTION

The present invention pertains to the field of lodging reservations data. More specifically, the invention relates to a system and method for providing lodging reservations data that allows current availability and rate data to be provided.

BACKGROUND OF THE INVENTION

Lodging reservations data systems are known in the art. Such lodging reservations data systems store room availability data, rate data, and other suitable data for use by guests, operators, or reservation agents of the lodging facility. These lodging reservations data systems allow the guests, operators, or reservation agents to determine room availability and rate information for the lodging facility, so as to make decisions on to whether to book a room, to assist with the room reservation process, or for other purposes.

Likewise, reservation systems are known that compile data for multiple lodging facilities. However, these reservation systems for multiple facilities are not updated in real time. The distributed or local lodging reservations data systems are not configured to interface with the reservation systems for multiple facilities, because they are not controlled by the same entities. Unlike the situation that exists in the airline industry, car rental industry, or other similar industries, where a there are a small number of large service providers, the lodging industry is typified by a large number of lodging facilities that are independently owned and operated. Thus, it has not been feasible to modify the large number of local reservation systems so that updated information can be provided to a reservation system for multiple facilities. As a result, search functionality for such systems is primitive, and typically limited to identifying properties that must then be separately contacted to determine whether reservations are available for a date of interest, and the rate for such reservations.

To resolve the problems with prior art systems, reservation systems for multiple facilities use static databases that reflect a small number of rates and availability data that is updated infrequently or not at all. A frequent problem encountered by such users is that the first reservation system will indicate availability of reservations or a particular rate, but upon contacting the local reservation data system, the user will find that the rate does not exist, or that rooms are not available. Thus, users of such reservation systems for multiple facilities must not only contact a reservation data system for each separate lodging facility of interest, but also frequently encounter facilities that do not have the rates of interest or do not have room availability. Thus, a user who is attempting to find a number of comparable properties to do a price comparison or provide options to a traveler must often directly contact a large number of properties to obtain on several choices or price points.

SUMMARY OF THE INVENTION

In accordance with the present invention, a system and method for providing lodging reservations data are presented that overcome known problems with providing lodging reservations data.

In particular, a system and method for providing lodging reservations data are provided that allow lodging reservations data from distributed sources to be assembled and compiled into a single database that is updated as rates or room availability changes, so as to allow a user to perform comparative analysis between available lodgings.

In accordance with an exemplary embodiment of the present invention, a system for providing reservation data is presented. The system includes a reservation data system interface that receives reservation data, such as the availability of rooms and rates for such rooms, and update data, such as when rates change or rooms are reserved, from two or more reservation systems, such as central reservation systems for two or more different hotels. A master reservation system receives the reservation data from the reservation data interface and stores the reservation data in a database, and updates the database with the update data. A user interface system coupled to the master reservation system receives reservation request data and provides updated reservation data in response to the reservation request data.

The present invention provides many important technical advantages. One important technical advantage of the present invention is a system and method for providing lodging reservations data that allows lodging reservations data from a plurality of sources to be combined and maintained. The present invention thus allows users to search across multiple properties so as to perform comparisons between available rates and rooms. The present invention also allows users to make reservations after locating a property with minimized risk that the property will not have a represented vacancy or rate.

Those skilled in the art will further appreciate the advantages and superior features of the invention together with other important aspects thereof on reading the detailed description that follows in conjunction with the drawings.

BRIEF DESCRIPTION OF THE, SEVERAL VIEWS OF THE DRAWINGS

DETAILED DESCRIPTION OF THE INVENTION

Figure 1:
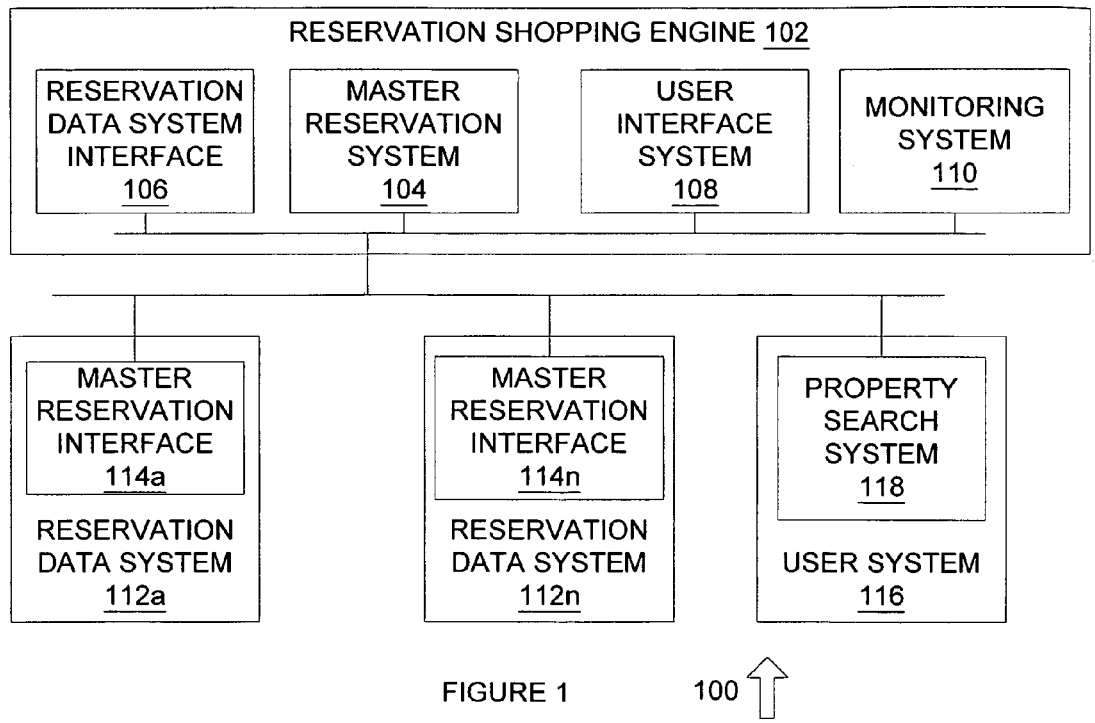
FIG. 1 is a diagram of a system for providing real time lodging reservations data from a centralized location in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for providing real time lodging reservations data from a centralized location in accordance with an exemplary embodiment of the present invention. System 100 allows a user to search multiple lodging facilities for updated lodging and rate data, so as to facilitate travel planning and room reservation related activities.

System 100 includes reservation shopping engine 102, which can be implemented in hardware, software, or a suitable combination of hardware and software, in which can be one or more software systems operating on a general purpose server platform. As used herein, the term software system can include one or more objects, agents, lines of code, threads, subroutines, databases, application programming interfaces (APIs), web browser plug-ins, or other suitable data structures, and can include two or more different lines of code or suitable data structures operating in two or more separate software applications, on two or more different processing platforms, or in other suitable architectures. In one exemplary embodiment, a software system can include one or more lines of code or other suitable data structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Reservation shopping engine 102 includes reservation data system interface 106, master reservation system 104, user interface system 108, and monitoring system 110. Master reservation system 104 stores room availability and rate data for a plurality of lodgings. The room availability and rate data stored in master reservation system 104 is updated in real time as reservations or rate changes are made at each of the distributed reservation data systems. Master reservation system 104 receives the updates through reservation data system interface 106.

Reservation shopping engine 102 is coupled to reservation data systems 112a through 112n by a communications medium 120. As used herein, the term "couple", and its cognate terms such as "couples" and "coupled", can include a physical connection (such as through a copper conductor), a virtual connection (such as one or more randomly assigned memory locations of a data memory device), a logical connection (such as through one or more logical devices of a semiconducting circuit), a wireless connection, other suitable connections, or a suitable combination of such connections. In one exemplary embodiment, systems and components are coupled to other systems and components through intervening systems and components, such as through an operating system of a general purpose server platform. Communications medium 120 can be a local area network, a wide area network, the public switched telephone network, the Internet, a frame relay, a wireless network, an optical network, other suitable communications media, or a suitable combination of such communications media.

Multiple redundant servers can be used for reservation shopping engine 102, such that each system and data file is redundantly stored and maintained. In this manner, the maximum throughput for search and read transactions can be obtained while providing for rapid restart and recovery. Operating databases of the reservation shopping engine 102 in a random access memory with a non-volatile backup can likewise improve the performance of the database. Additional optimization can be achieved through the use of hashing algorithms to find chains and properties.

Reservation data systems 112a through 112n are lodging facility reservation data systems that are operated by single lodging facilities, collections of properties within the chain, entire chains, or other suitable entities. In one exemplary embodiment, reservation data system 112a through 112n can be implemented in hardware, software, or a suitable combination of hardware and software, and can be one or more software systems operating on a general purpose server platform. Reservation data systems 112a through 112n can be used to track room availability and rate data at one or more lodging facilities. Likewise, reservation data systems 112a through 112n can be configured to allow operators of the reservation data systems or users to access reservation data systems 112a through 112n, such as through communications medium 120, and to directly determine the availability of reservations, rooms, rates, or other suitable data. Likewise, reservation data systems 112a through 112n can allow the operator to update rate plans, room classifications, or other suitable data.

Each reservation data system 112a through 112n includes a master reservation interface 114a through 114n, respectively. The master reservation interface 114a through 114n can interface with reservation shopping engine 102 through reservation data system interface 106. In one exemplary embodiment, master reservation interface 114a through 114n can be an application programming interface that is installed on a server platform on which reservation data systems 112a through 112n operate, after each reservation data system has been installed and is operating. In another exemplary embodiment, master reservation interface 114a through 114n can be incorporated into a software package that is distributed with reservation data system 112a through 112n and other suitable systems, such that the software code structures for master reservation interface 114a through 114n can be contained as a module, sub-routine, distributed lines of code, or other suitable software structures that operate in conjunction with reservation data systems 112a through 112n. Other suitable configurations for master reservation interfaces 114a through 114n can likewise be used.

Reservation data system interface 106 receives an initial availability and rate loading of data from reservation data systems 112a through 112n via master reservation interfaces 114a through 114n, such as chain level descriptions of available properties within the chain, property level data defining the types of rooms and the rate plan room type availability and room identification data, and property level data for rate plans for the rates for such rooms. Reservation data system interface 106 can also receive the property level data on demand from reservation data systems 112a through 112n at predetermined batch load times, or other suitable times. Reservation data system interface 106 then provides this data to master reservation system 104, where the chain, property and rate plan data is stored for future access.

Likewise, reservation data system interface 106 receives status update data from reservation data systems 112a through 112n via master reservation interfaces 114a through 114n. In this exemplary embodiment, when a guest makes a reservation at one of reservation data systems 112a through 112n, master reservation interface 114a receives the reservation data and generates status update data for transmission to reservation data system interface 106. Likewise, if rate data is modified, distressed inventory becomes available, or other suitable data is made available, this data can be provided via master reservation interfaces 114a through 114*n* to reservation data system interface 106 for updating of master reservation system 104. This status update data is used to update the existing data that has been loaded from reservation data systems 112*a* through 112*n* that defines the chain, property and rate plans available.

Monitoring system 110 monitors the transmission of status update data and generates a sequence number associated with each status update. This sequence number is stored with the status update, and is used to determine whether database updates to master reservation system 104 have been maintained in an appropriate order. Sequence numbers can also be assigned to maintenance transactions in order to insure that the these transactions are applied to the master reservation system database in the correct order. The status updates and maintenance transactions can also be written into a log file to ensure that all status updates and maintenance transactions received and acknowledged by the reservation data system interface 106 are processed by the master reservation system 104 even if one of two or more servers on which the master reservation system 104 operates was down when a status update or maintenance transaction was received by the reservation data system interface 106. For example, if the server or distributed servers on which reservation shopping engine 102 operates encounters a malfunction, it is possible that status updates might be lost. Monitoring system 110 is used to generate sequence numbers that are used to determine whether the status updates to master reservation system 104 are continuous. Thus, if the status updates to master reservation system 104 are determined to be missing sequence numbers, a backup of the status updates received from reservation data systems 112*a* through 112*n* can be performed. In this manner, the integrity of the database used by master reservation system 104 to maintain rate and availability data can be maintained.

User system 116 and property search system 118 can be implemented in hardware, software, or a suitable combination of hardware and software, and can be one or more software systems operating on a general purpose processing platform. In one exemplary embodiment, user system 116 and property search system 118 can include a web browser system and accompanying web browser plug-in, API, stand-alone package, or other suitable software structures that are used to allow a property search system 118 to interface with reservation shopping engine 102 through user interface system 108.

Property search system 118 allows the user to submit reservation request data and to receive reservation data from reservation shopping engine 102. In one exemplary embodiment, a user can search based on a specific property to identify rooms and rate data for that property. Likewise, the user can also search for classes of room (such as suites, budget rooms, ocean view rooms, or other suitable classes of room), room rates (such as family rates, weekend rates, corporate rates, or other suitable classes of rates), properties having certain amenities such as tennis courts or swimming pools, or other suitable search criteria. Property search system 118 thus interfaces with master reservation system 104 through user interface system 108, to provide real time availability and rate data for properties offered reservation data systems 112*a* through 112*n*. System 100 eliminates the need for property search system 118 to have direct, real-time access to each of reservation data systems 112*a* through 112*n*, such as would be required by a system that merely lists hotels in a location, systems in which reservation and rate data is not updated continuously, or other similar prior art systems. Thus, property search system 118 can be configured to interface with master reservation system 104, reservation data system interface 106, and reservation data systems 112*a* so as to allow the user to directly interface and determine availability and rates with reservation data system 112*a*. Reservation data system 112*a* can then generate status updates for updating the database of master reservation system 104 in response to the reservation made from the user of user system 116 and property search system 118 to master reservation interface 114*a* and reservation data system 112*a* through 112*n*.

In another exemplary embodiment, the user of property search system 118 can determine rates and availability by interfacing with reservation data systems 112*a* through 112*n* through reservation shopping engine 102. In another exemplary embodiment, the user can be directed to deal directly with reservation data systems 112*a* through 112*n* via communications medium 120 after a suitable reservation or rate has been located by the user of property search system 118. In this configuration, the user is assured that the rate and reservation that has been presented to the user will be available through the reservation data system 112*a* through 112*n*, and that the user will not contact that reservation data system and enter the reservation request data, only to find that the offered rate or lodging facility is not available. Likewise, other suitable configurations or processes can be used.

Property search system 118 can also include a soft date search system, such as when used in conjunction with an optimized database architecture as described above in regards to reservation shopping engine 102. The soft date system allows a user to specify a range of dates and then to search for an optimal price, rate class, day of week, location, or other suitable features. An optimal database architecture allows the search to be performed in real time, so as to allow the user to obtain results in a manner that allows them to be used for travel planning, to assist with making reservations, and for other suitable purposes.

In operation, system 100 allows a user to find lodging facilities offering lodgings at user-defined prices, in user-defined locations, or in accordance with other user-defined criteria directly, without requiring the user to search by accessing each reservation data system independently. Thus, system 100 allows a user to obtain real time reservation availability and rate data for a plurality of properties, so as to allow the user to generate a list showing the available rates and reservation data and to allow the user to make selections between properties in real time. In this manner, system 100 facilitates the travel planning and reservation processes for users.

Likewise, system 100 allows a master reservation system to be maintained that receives status update data from distributed properties such as reservation availability data and rate data. The status updates are tracked by sequence number so as to maintain the integrity of the database that used to store the real time rate and availability data.

Figure 2:
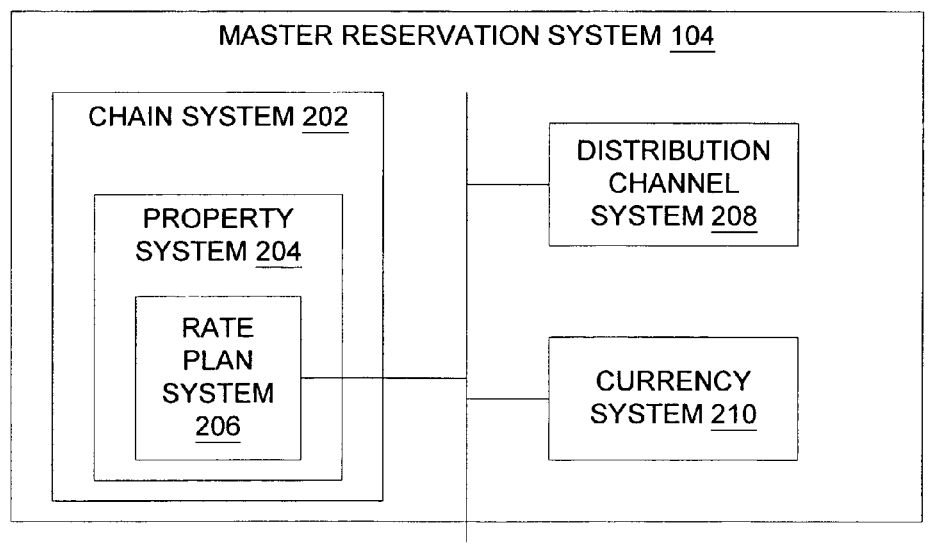
FIG. 2 is a diagram of a system for providing master reservation system data storing and updating functionality in accordance with an exemplary embodiment of the present invention.

FIG. 2 is a diagram of a system 200 for providing master reservation system data storing and updating functionality in accordance with an exemplary embodiment of the present invention. System 200 allows lodging facilities to be organized according to chain, property, rate plan, and other suitable data, so as to facilitate the organization and accessing of rate and availability data for such lodging facilities.

System 200 includes chain system 202, property system 204, rate plan system 206, distribution channel system 208, and currency system 210, each of which can be implemented in hardware, software, or a suitable combination of hardware and software, and which can be one or more software systems operating on a general purpose server platform.

Chain system 202 allows a user to add, modify, or delete a chain of hotel or lodging facility properties. In one exemplary embodiment, chain system 202 can include a chain addition function that allows the user to provide a chain ID and description, a chain update function that allows the user to modify the chain ID and description, a chain delete function that allows the user to identify a chain for deletion, or other suitable functions. Chain system 202 further allows properties, rate plans, and other suitable data to be affiliated with the chain, such as by a direct object reference. Field restrictions can be imposed for editing and deletion purposes, such as to limit the number of fields that can be edited after a chain is added, and to require certain fields to be identified before a chain can be deleted. Likewise, authority to delete and modify can be limited to a system administrator, the user that initially input the chain, or other suitable parties.

Property system 204 allows a user to add, delete, or modify property data, to associate the property data with a chain and rate plan, and to perform other suitable functions. In one exemplary embodiment, property system 204 can allow a user to add a property by providing a chain ID for the property, a property ID, and a minimum lead time for the minimum number of days prior to the date of arrival that a booking will be accepted. A flag can also see be provided to indicate whether the property has been enabled for access through master reservation system 104. Likewise, property system 204 can allow a user to update a property by providing a chain ID and property ID to locate a property with, and to adjust the minimum lead time or number of days prior to date of arrival for booking and to change the master reservation system compatibility or enablement flag. Property system 204 can also allow a user to delete the property upon entry of a chain ID and property ID that specifically identifies the property to be deleted. Field restrictions can be imposed for editing and deletion purposes, such as to limit the number of fields that can be edited after a property is added, and to require certain fields to be identified before a property can be deleted. Likewise, authority to delete and modify can be limited to a system administrator, the user that initially input the property, or other suitable parties.

Rate plan system 206 allows the user to add, modify, or delete a rate plan associated with a property, a chain, or other suitable entities or groups of entities. The rate plans can be room type based rate plans, such that for each rate plan there is a series of one or more room types associated with the rate plan to which the rate amounts are attached. The rate plans that are room based can be referred to as specific rate plans.

Likewise, rate plan system 206 can use two or more different reference rate plans, such as a generic rate plan and a subordinate rate plan. A generic rate plan can be configured to return a series of related rates. In one exemplary embodiment a generic rate plan for corporate rates might return specific rate plans for three different corporate rates. A subordinate rate plan may refer to multiple specific rate plans but is date driven and therefore can return only one specific rate plan for period specified.

Rate plan system 206 allows a user to add, modify, or delete specific rate plan data. In one exemplary embodiment, the user can add a specific rate plan by providing a chain ID, a property ID, a rate plan ID, start date data, end date data, the minimum number of days prior to the date of arrival that is permissible under the rate plan, the minimum length of stay that is permissible under the rate plan, the maximum length of stay that is permissible under the rate plan, and other suitable parameters. The user can also provide arrival day qualification parameters, such as to indicate whether or not arrival on a given date or day of the week is permissible under the rate plan. Currency code data can also be provided to indicate the type of currency that rates for the rate plan are provided in. A distribution channel flag can also be used to indicate whether only one or more distribution channels can be used to offer the rate plan, whether one or more distribution channels should be blocked from offering the rate plan, or for other suitable functions. Rate plan system 206 can also allow room types to be added and deleted, distribution codes to be added and deleted, and other suitable parameters to be provided. Field restrictions can be imposed for editing and deletion purposes, such as to limit the number of fields that can be edited after a rate plan is added, and to require certain fields to be identified before a rate plan can be deleted. Likewise, authority to delete and modify can be limited to a system administrator, the user that initially input the rate plan, or other suitable parties.

Distribution channel system 208 allows distribution channels to be identified for identification of rate and room availability data. In one exemplary embodiment, a distribution channel can be created that allows certain user systems 116 to offer preferred rates, to offer rates for certain rooms, or other suitable restrictions on hotel inventory. For example, if a conference is being planned and the reservations for that conference are being controlled through a single distribution channel, a distribution channel for that conference can be created. Distribution channel system 208 allows the user to add, update, or delete a distribution channel, such as by providing a channel identifier and description. Field restrictions can be imposed for editing and deletion purposes, such as to limit the number of fields that can be edited after a distribution channel is added, and to require certain fields to be identified before a distribution channel can be deleted. Likewise, authority to delete and modify can be limited to a system administrator, the user that initially input the distribution channel, or other suitable parties.

Currency system 210 allows a user to add, update, or delete currencies that can be used to provide currency conversions for lodging rates. In one exemplary embodiment, the currency system 210 can provide a currency ID field, a resolution field (such as to identify the smallest unit of currency that will be allowed), and an exchange rate for conversion between a base currency and the foreign currency. Modification of the resolution or exchange rate can be performed upon entry of a suitable currency ID, and the currency ID can also be used to delete the currency. Field restrictions can be imposed for editing and deletion purposes, such as to limit the number of fields that can be edited after a currency is added, and to require certain fields to be identified before a currency can be deleted. Likewise, authority to delete and modify can be limited to a system administrator, the user that initially input the currency, or other suitable parties.

In operation, system 200 is used to provide master reservation system setup and structuring capabilities that allow a database to be generated and maintained for a master reservation system. System 200 allows a structure to be created that can be updated and searched easily by a large number of users without requiring reservation data systems for lodging facilities to be directly accessed. System 200 thus provides a common interface between the reservation data systems for a large number of properties, and identifies the data structure and management structure for organizing and accessing the data in the manner that allows the data to be easily maintained, modified, updated. System 200 thus allows users to search large numbers of properties to identify properties of interest, and also allows users to assemble a portfolio or search report so as to allow comparisons between properties to be made based upon current data.

Figure 3:
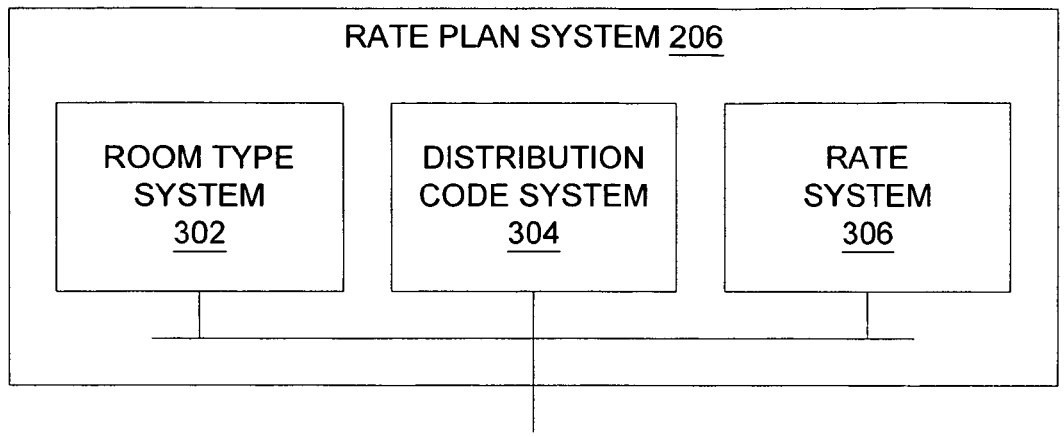
FIG. 3 is a diagram of a system for providing rate plan addition, modification, and deletion functionality in accordance with an exemplary embodiment of the present invention.

FIG. 3 is a diagram of a system 300 for providing rate plan addition, modification, and deletion functionality in accordance with an exemplary embodiment of the present invention. System 300 allows rate plans to be associated with properties and chains for use in providing real time access to rate and room availability information in a lodging reservation system.

System 300 includes room type system 302, distribution code system 304, and rate system 306, each of which can be implemented in hardware, software, or a suitable combination of hardware and software, and which can be one or more software systems operating in a general purpose server platform. Room type system 302 allows a rate plan room type to be identified, modified, or deleted as required to support the rate plans for properties and chains. In one exemplary embodiment, room type system 302 can allow an operator to provide a chain ID, a property ID, and a rate plan ID for the room, and to provide a room type ID for which rates and statuses are to be maintained for the rate plan. The room type can be provided, can already be associated with the property, or can be set in other suitable manners. Multiple instances of this element can be included in a single transaction. If room type level detail is not required for the associated rate plan, a single room type with an ID of "ALL" can be added to the rate plan. Other suitable room type data can be used. Field restrictions can also be imposed for editing and deletion purposes, such as to limit the number of fields that can be edited after a room type has been added, and to require certain fields to be identified before a room type can be deleted. Likewise, authority to delete and modify can be limited to a system administrator, the user that initially input the room type, or other suitable parties.

Distribution code system 304 allows rate plans that are restricted for sale via certain distribution channels to be identified, so as to facilitate setting such restrictions. Distribution code system 304 can allow a distribution channel code to be added, modified, or deleted in support of distribution channel functions. In one exemplary embodiment, distribution code system 304 can allow a user to provide a chain ID, a property ID, and a rate plan ID, and then to provide a channel ID and associating description that is added to the distribution channel list for that rate plan. One or more instances of this element may be included in a single transaction. Other suitable distribution code data can be used. Field restrictions can be imposed for editing and deletion purposes, such as to limit the number of fields that can be edited after a distribution code is added, and to require certain fields to be identified before a distribution code can be deleted. Likewise, authority to delete and modify can be limited to a system administrator, the user that initially input the distribution code, or other suitable parties.

Rate system 306 allows a user to identify generic rate plan data, subordinate rate plan data, specific rate plan data, and other suitable rate plan data for use in classifying rate data for watching facility rooms. In one exemplary embodiment, rate system 306 can allow a code classification to be provided as a generic rate plan having one or more predetermined rate plan fields, such as:

ASC—association rates
CLB—club rates
CNV—convention rates
COR—corporate rates
FAM—family plan rates
GOV—government rates
MIL—military rates
PKG—package rates
PRO—promotional rates
RAC—rack rates
SNR—senior rates
TUR—tour rates
WKD—weekend rates These generic rate plan fields can be used as a default in the absence of any additional specific or subordinate rate plans. Other suitable rate plans can also be used, such as property specific generic rate plans.

A generic rate plan can consist of two parts—the rate plan definition and the related rate plan members (i.e. the associated specific rate plans that make up the aggregation). The rate plan definition will control whether the reservation shopping engine 102 should provide a single rate range for the entire generic plan in response to a query, should provide individual subordinate rate plans that make up an aggregate rate plan, or should use other suitable rate plan data. A subordinate rate plan may reference multiple specific rate plans that are each associated with a reference that is date driven. In this manner, the subordinate rate plans can be used to provide date driven rate data. Rate system 306 allows generic rate plans to be added, modified, or deleted, upon entry of a chain ID, property ID, rate plan ID, or other suitable data. Likewise, generic rate plan members can be associated with generic rate plans, and can be added, modified, or deleted by rate system 306. Field restrictions can be imposed for editing and deletion purposes, such as to limit the number of fields that can be edited after a generic, specific, or subordinate rate plan is added, and to require certain fields to be identified before such rate plans can be deleted. Likewise, authority to delete and modify can be limited to a system administrator, the user that initially input the rate plan, or other suitable parties.

Rate system 306 also allows actual values to be associated with each specific rate plan and to be maintained separately so that the rate updates can be efficiently processed. Downloading of rate information from the reservation data systems 112a through 112n to the master reservation system 104 can be a scheduled event that triggers an "update rates" transaction that contains chain ID data, property ID data, rate plan ID data, room type ID data, date range start and end data, rates for each day in the date range, minimum rate data, extra person minimum data, maximum rate data, extra person maximum data, and other suitable data.

In operation, system 300 allows rate plan data for properties and chains to be created, updated, and otherwise maintained so as to allow coordination of rate and availability information through a master reservation system. System 300 allows a structured format to be applied to a database for storing room availability and rate data for a large number of properties so as to allow the database to be easily updated and maintained and to allow users to readily search the database to identify properties of interest.

Figure 4:
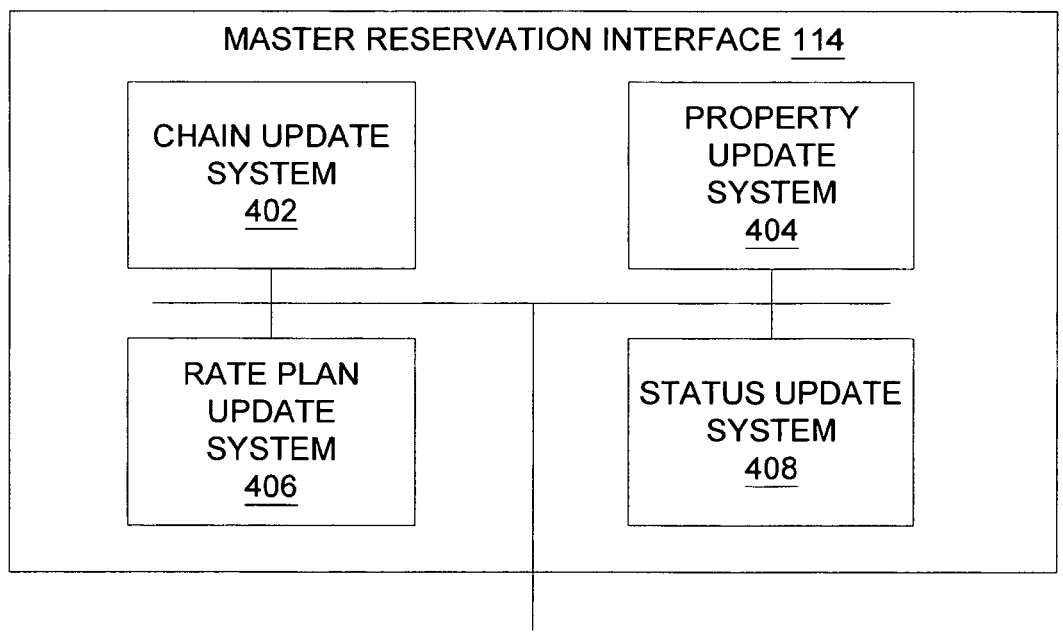
FIG. 4 is a diagram of a system for providing master reservation interface functionality in accordance with an exemplary embodiment of the present invention.

FIG. 4 is a diagram of a system 400 for providing master reservation interface functionality in accordance with an exemplary embodiment of the present invention. System 400 allows a user at a reservation data system to access a master reservation system and perform database structure updates, status updates, and other suitable updates to allow reservation rate and availability data from the reservation data system to be maintained in the master reservation system.

System 400 includes master reservation interface 114 and chain update system 402, property update system 404, rate plan update system 406, and status update system 408, each of which can be implemented in hardware, software, or a suitable combination of hardware and software, and which can be one or more software systems operating on a general purpose server platform. Chain update system 402 allows a user to add, modify, or delete a chain of hotel or lodging facility properties. In one exemplary embodiment, chain update system 402 can include a chain addition function that allows the user to provide a chain ID and description, a chain update function that allows the user to modify the chain ID and description, a chain delete function that allows the character to identify a chain for deletion, or other suitable functions. Chain update system 402 further allows properties, rate plans, and other suitable data to be affiliated with the chain, such as by assigning a chain field in a database for all properties, rate plans and other suitable data. Field restrictions can be imposed for editing and deletion purposes, such as to limit the number of fields that can be edited after a chain is added, and to require certain fields to be identified before a chain can be deleted. Likewise, authority to delete and modify can be limited to a system administrator, the user that initially input the chain, or other suitable parties.

Property update system 404 allows a user to add, delete, or modify property data, to associate the property data with a chain and rate plans, and to perform other suitable functions. In one exemplary embodiment, property update system 404 can allow a user to add a property by providing a chain ID for the property, a property ID, and a minimum lead time for the minimum number of days prior to the date of arrival that a booking will be accepted. A flag can also see be provided to indicate whether the property has been enabled for access through master reservation system 104. Likewise, property update system 404 can allow a user to update a property by providing a chain ID and property ID to locate a property with, and to adjust the minimum lead time or number of days prior to date of arrival for booking and to change the master reservation system compatibility or enablement flag. Property update system 404 can also allow a user to delete the property upon entry of a chain ID and property ID that specifically identifies the property to be deleted. Field restrictions can be imposed for editing and deletion purposes, such as to limit the number of fields that can be edited after a property is added, and to require certain fields to be identified before a property can be deleted. Likewise, authority to delete and modify can be limited to a system administrator, the user that initially input the property, or other suitable parties.

Rate plan update system 406 allows the user to add, modify, or delete a rate plan associated with a property, a chain, or other suitable entities or groups of entities. The rate plans can be specific rate plans, generic rate plans, subordinate rate plans, or other suitable rate plans. In one exemplary embodiment, the user can add a rate plan by providing a chain ID, a property ID, a rate plan ID, start date data, end date data, the minimum number of days prior to the date of arrival that is permissible under the rate plan, the minimum length of stay that is permissible under the rate plan, the maximum length of stay that is permissible under the rate plan, and other suitable parameters. The user can also provide arrival day qualification parameters, such as to indicate whether or not arrival on a given date or day of the week is permissible under the rate plan. Currency code data can also be provided to indicate the type of currency that is permissible under the rate plan. A distribution channel flag can also be used to indicate whether or not one or more distribution channels can be used to offer the rate plan. Rate plan update system 406 can also allow room types to be added and deleted, distribution codes to be added and deleted, and other suitable parameters to be provided. Field restrictions can be imposed for editing and deletion purposes, such as to limit the number of fields that can be edited after a rate plan is added, and to require certain fields to be identified before a rate plan can be deleted. Likewise, authority to delete and modify can be limited to a system administrator, the user that initially input the rate plan, or other suitable parties.

Status update system 408 receives status update data at a reservation data system and provides the status update data to a master reservation system. In one exemplary embodiment, status update system 408 can receive room reservation data, rate change data, or other suitable data, and can provide the data updates as status update data to a master reservation system 104 or other suitable systems. In this manner, status update system 408 provides real time status update data to master reservation system database to allow room availability and rate information to be centrally maintained. Status update system 408 can also provide such updates at predetermined intervals, such as once a day, once an hour, or at other suitable intervals.

In operation, system 400 provides distributed access to a master reservation system or other suitable systems that are used to provide centralized access to lodging facility reservation and rates and availability data. System 400 can provide continuous or periodic status update data to the master reservation system or other suitable systems, and also allows an operator to modify the database structure to add chain data, property data, rate plan data or other suitable data.

Figure 5:
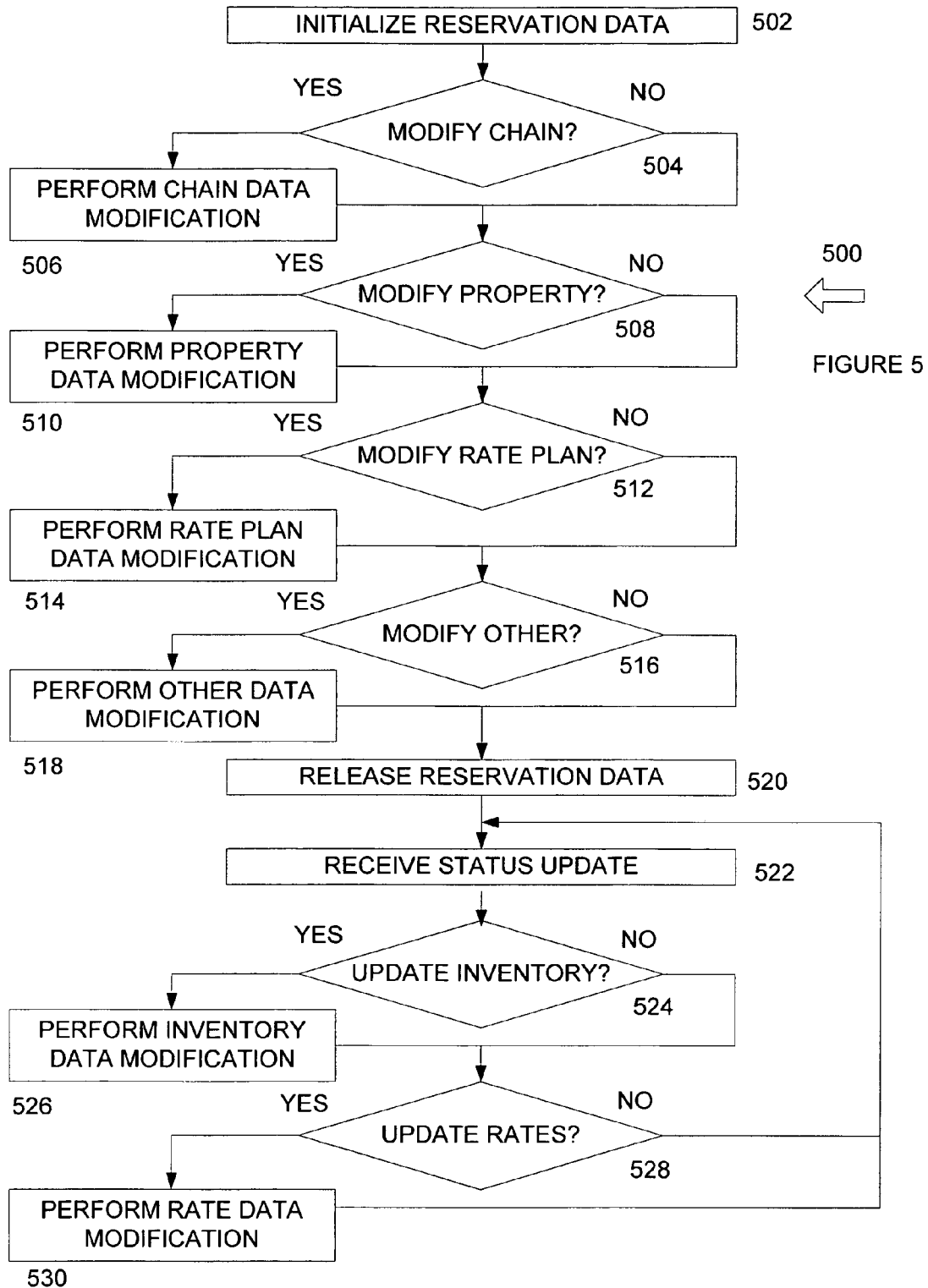
FIG. 5 is a flow chart of a method for providing reservation data from a centralized location in accordance with an exemplary embodiment of the present invention.

FIG. 5 is a flow chart of a method 500 for providing reservation data from a centralized location in accordance with an exemplary embodiment of the present invention. Method 500 allows reservation availability and rate data for a plurality of lodging facilities to be maintained in a centralized location to facilitate searching, travel planning and reservation activities and other suitable activities.

Method 500 begins at 502 where reservation data is initialized. Initialization of reservation data is performed to structure a database at the central search facility, update the database to reflect modifications, or perform other suitable functions. The method then proceeds to 504 where it is determined whether chain modification is to be performed. In one exemplary embodiment, a chain can be modified to add a new chain, to reflect acquisition of a hotel chain or hotel, the change of name of a hotel chain, or other suitable functions. If it is determined at 504 that modification of the chain is not required, the method proceeds to 508. Otherwise, the method proceeds to 506 where chain modification is performed. For example, a new chain can be added, the description data or chain identifier for an existing chain can be modified, a chain can be deleted, or other suitable chain functions can be performed. The method then proceeds to 508.

At 508, it is determined whether property modification is to be performed. If property modification does not need to be performed the method proceeds directly to 512. Otherwise, the method proceeds to 510 where property data modification is performed. In one exemplary embodiment, the property data modification can include the entry of a new property ID, property description or other suitable data. The property data can also be modified, deleted, or other suitable processes can be performed. The method then proceeds to 512.

At 512, it is determined whether rate plan modification is to be performed. If rate plan data does not need to be performed the method proceeds to 516. Otherwise, the method proceeds to 514 where rate plan data modification is performed. In one exemplary embodiment, the rate plan data can include entry of a generic rate plan, a subordinate rate plan, a specific rate plan or other suitable rate plans. The rate plan data can also be modified or deleted, or other suitable processes can be performed. The method then proceeds to 516.

At 516, it is determined whether other data modification is required. For example, other data fields may be set up to facilitate the distribution of hotel property lodging inventory through various advertising channels, distribution channels, for special events, for the purpose of moving distressed inventory or to reduce unreserved or undedicated room reservations on short notice, to add or delete a currency, or for other suitable purposes. If it is determined that other modifications are not required the method proceeds directly to 520. Otherwise, the method proceeds to 518 where the modification of the other data fields is performed. The method then proceeds to 520.

At 520, the reservation data is released. In one exemplary embodiment, reservation data can be released after it has been reviewed by the data entry entity to ensure that it is correct, can be released in batches at predetermined times, or other suitable reservation data release mechanisms can be implemented. The method the proceeds to 522 after the reservation data has been released and entered in to service.

At 522, status update data is received. In one exemplary embodiment, status update data is received when a room is rented, when a room is reserved, when a rate is changed, when a hotel property manager decides to lower rates to increase occupancy, when a promotion is offered, or at other suitable times. The method then proceeds to 524 where it is determined whether the status update requires updating the availability data, such as when one or more rooms have been reserved. If availability data update is not required the method proceeds to 528. Otherwise the method proceeds to 526 where availability data modification is performed. The availability data modification can include the generation of sequence number, in storing the availability modification record in a tracking log or database for backup purposes, or other suitable procedures. The method then proceeds to 528.

At 528, it is determined whether rate data should be updated as a result of the status update. If rate data is not required the method returns to 522. Otherwise, the method proceeds to 530 where the rate data modification is performed. Likewise, a sequence number can be generated, the rate data modification can be stored in a log file for backup purposes, or other suitable procedures can be used. The method then returns to 522.

In operation, method 500 allows reservation availability and rate data to be centrally maintained, so as to facilitate the location and placement of reservations at a large number of lodging facilities. Method 500 allows a centralized database to be assembled by receiving chain, property, rate plan, and other database structure data from a large number of properties. This database data is then configured into a database which is accessible by users to identify rates and availability of properties. The database is updated on a continuous basis as rate and availability changes, and the updates are stored so as to provide recovery functionality in the event the database requires recovery.

Figure 6:
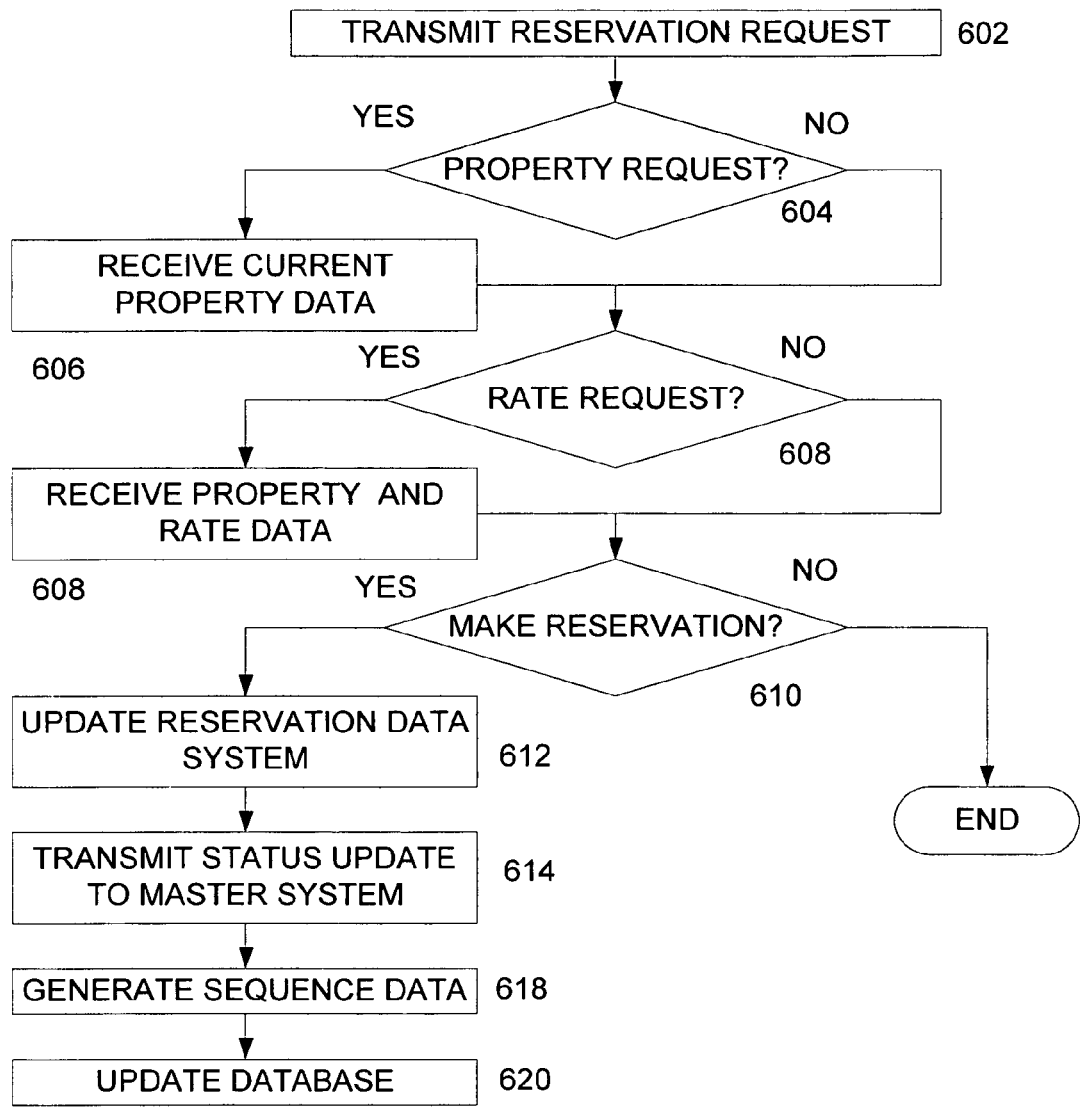
FIG. 6 is a flowchart of a method for accessing a centralized reservation database in accordance with an exemplary embodiment of the present invention.

FIG. 6 is a flowchart of a method 600 for accessing a centralized reservation database in accordance with an exemplary embodiment of the present invention. Method 600 allows the user to access one or more properties to identify room availability and rat-e information, such as for travel planning purposes, so as to locate properties at which to make reservations, or for other suitable purposes.

Method 600 begins at 602 where reservation request data is transmitted to the central database. In one exemplary embodiment, a user shopping for reservations transmits the reservation request data to locate properties having availability and to identify the rates for such properties. The reservation request data can be transmitted from a suitable software system, such as a plug-in to a web browser system, a stand-alone client application, from a web browser page generated with *.html, *.xml, or other suitable data. The method then proceeds to 604.

At 604, it is determined whether the reservation request included a property request, such as a specific property, properties having a class of room or amenities, properties in a location (such as lodging facilities within a certain area, hotels within a certain zip code, hotels within a certain map quadrant or other suitable location data), or other suitable data. If a property was not requested the method proceeds to 608. Otherwise the method proceeds to 606 where current property data is received in response to the property request. The current property data can be stored for use in conjunction with rate request data or other suitable request data so that a comparison can be made between the property and other properties. The method then proceeds to 608.

At 608, it is determined whether a rate request has been received. For example, a rate request can be a request for all lodging facilities having a rate within a certain range, for lodging facilities offering rates for a predetermined class of accommodation (such as a member of a travel group), lodging facilities offering a predetermined discount, or other suitable rate request. If it is determined at 608 that a rate request has not been received the method proceeds to 612. Otherwise the method proceeds to 606 where property and rate data is received in response to the rate request. In one exemplary embodiment, the property and rate data can be organized so as to allow the user to compare properties and rates, such as by allowing the user to select a comparison criteria (such as location, amenities, room size, or other suitable comparison data) and to then sort or arrange the properties received by the selected criteria. The method then proceeds to 612.

At 612, it is determined whether a property has been identified that the user wishes to make a reservation at. For example, it is possible that no properties could be identified from the reservation request, or that the properties identified by the reservation request do not contain any properties of interest for the user. If the user does not wish to make a reservation the method proceeds to 622 and terminates. Otherwise the method proceeds to 614 where the reservation data is received at the reservation data system and the reservation data system is updated to reflect the reservation. For example, the local property reservation system may update reservation data to indicate the receipt of a reservation, the reservation shopping engine can interface with the local property reservation system to place the reservation, or other suitable procedures can be used. The method then proceeds to 616 where a status update is transmitted to a master tracking system. In one exemplary embodiment, the master tracking system can interface with the local reservation data system to make the reservation. Likewise, the reservation can be made directly with the local reservation data system, and the status update can then be transmitted to the master tracking system, or other suitable processes can be used. The method then proceeds to 618.

At 618, sequence data is generated to identify the status update data for storing in a log file. The sequence data can also be tracked so as to determine whether a break in sequence has occurred. The method then proceeds to 620. At 620 a database is updated to reflect the current status of the reservations and rates at the properties. The database can be a centrally located database, or other suitable databases.

In operation, method 600 is used to allow a user to access a central database to determine rate and availability information for a plurality of hotels. Method 600 allows the user to perform hotel reservation services, travel planning services, make reservations, locate lodging facilities of interest, or perform other suitable services by obtaining information on lodging rates and availability for a large number of properties without requiring the user to directly access independent reservation data systems and compile reports and comparison data independently.

Although exemplary embodiments of a system and method of the present invention been described in detail herein, those skilled in the art will also recognize that various substitutions and modifications can be made to the systems and methods without departing from the scope and spirit of the appended claims.

What is claimed is:

1. A system for providing reservation data comprising:
   a reservation data system interface receiving reservation inventory data and inventory update data from two or more reservation data systems; and
   a master reservation system coupled to the reservation data system interface, the master reservation system receiving the reservation inventory data and storing the reservation inventory data in a database, the master reservation system receiving the inventory update data and updating the database with the inventory update data;
   a user interface system coupled to the master reservation system, the user interface system receiving reservation request data and providing updated reservation inventory data in response to the reservation request data;
   wherein the inventory update data is generated in real time as each reservation system is updated to reflect current inventory; and
   a monitoring system coupled to the master reservation system, the monitoring system storing each set of inventory update data and sequence number data associated with the set of inventory update data.

2. The system of claim 1 further comprising a master reservation interface system coupled to the reservation data system interface and one of the reservation data systems, the master reservation interface system receiving the inventory update data from the reservation data system and transmitting the inventory update data to the reservation data system interface.

3. The system of claim 2 wherein the reservation inventory data includes room availability data for each of the available rooms at each property managed by each of the two or more reservation systems, and where the inventory update data includes rented room data at one of the properties that reflects rooms that were previously indicated as being available at that property and which have since become unavailable.

4. The system of claim 1 wherein the master reservation system further comprises a chain system receiving chain modification data and updating the database with the chain modification data.

5. The system of claim 1 wherein the master reservation system further comprises a property system receiving property modification data and updating the database with the property modification data.

6. The system of claim 1 wherein the master reservation system further comprises a rate plan system receiving rate plan modification data and updating the database with the rate plan modification data.

7. The system of claim 1 wherein the master reservation system further comprises a distribution channel system receiving distribution channel modification data and updating the database with the distribution channel modification data.

8. The system of claim 1 further comprising:
   a master reservation interface system coupled to the reservation data system interface and one of the reservation data systems, the master reservation system receiving the inventory update data from the reservation data system regardless of the source of the inventory update data and transmitting the inventory update data to the reservation data system interface;
   a status update system providing status update data that includes room reservation data and rate change data to the master reservation interface system when the status update data becomes effective for the corresponding reservation system; and
   wherein the master reservation interface system transmits the status update to the master reservation system upon receiving the status update data from the status update system.

9. A method for providing reservation data comprising:
   storing reservation inventory data from two or more reservation data systems in a database;
   receiving inventory status update data from one or more of the reservation data systems in real-time as such inventory status update data is implemented in the associated reservation data system;
   updating the database with the inventory status update data; and
   storing the inventory status update data with an associated sequence number.

10. The method of claim 9 wherein storing reservation inventory data from two or more reservation data systems in a database comprises storing hotel chain data.

11. The method of claim 9 wherein storing reservation data from two or more reservation data systems in a database comprises storing property data.

12. The method of claim 9 wherein storing reservation data from two or more reservation data systems in a database comprises storing rate plan data.

13. The method of claim 9 wherein receiving inventory status update data from one or more of the reservation data systems comprises receiving room availability update data that indicates that a room that had previously been indicated as being reserved has since become available.

14. The method of claim 9 wherein receiving inventory status update data from one or more of the reservation data systems comprises receiving room price update data.

15. The method of claim 9 wherein receiving inventory status update data from one or more of the reservation data systems comprises receiving distressed inventory data.

16. A method for providing reservation data comprising:
   storing reservation data reflecting the current status of available inventory from two or more properties from a room availability database from each of two or more reservation data systems in a database and updating the database with status update data reflecting the availability of previously unavailable inventory;

receiving a request for reservation data for one or more of the properties at a central interlace;

providing reservation data reflecting the current status of the property;

wherein the available inventory at each of the two or more properties can be independently modified from an interface other than the central interface, and wherein the current status of the available inventory at each property reflects such independent modifications; and wherein updating the database with status update data further comprises storing the status update data and a unique transaction sequence number associated with the status update data.

17. The method of claim 16 wherein receiving the request for reservation data for one or more of the properties comprises receiving a request for distressed inventory.

18. The method of claim 16 wherein receiving the request for reservation data for one of the properties comprises receiving a request for rate plan data.

19. The method of claim 16 wherein receiving the request for reservation data for one of the properties comprises receiving a request for negotiated rate data.

20. The method of claim 16 wherein storing reservation data reflecting the current status of available inventory from two or more properties from two or more reservation data systems in a database comprises:

receiving status update data at a local property reservation system when a room at a property has been reserved;

transmitting the status update data to the database; and updating a central database to decrease the number of available rooms for the property.

21. The method of claim 16 wherein storing reservation data reflecting the current status of two or more properties from two or more reservation data systems in a database comprises:

receiving status update data at a local property reservation system when a rate plan at the property has been changed;

transmitting the status update data to the database; and updating a central database to change the rate plan for each of the rooms for the property.

22. The method of claim 16 wherein storing reservation data reflecting the current status of two or more properties from two or more reservation data systems in a database comprises:

receiving status update data at a hotel chain reservation system when distribution channel data for a hotel chain has been changed;

transmitting the status update data to the database, and updating a central database to change the distribution channel data for each of two or more properties in the hotel chain.

* * * * *

UNITED STATES PATENT AND TRADEMARK OFFICE
CERTIFICATE OF CORRECTION

PATENT NO. : 7,076,451 B1  Page 1 of 1
APPLICATION NO. : 09/862865
DATED : July 11, 2006
INVENTOR(S) : Coupland et al.

It is certified that error appears in the above-identified patent and that said Letters Patent is hereby corrected as shown below:

Col. 17, line 4, please change "interlace" to -- interface --.

Signed and Sealed this

Seventeenth Day of October, 2006

JON W. DUDAS
*Director of the United States Patent and Trademark Office*